United States Patent [19]
Fukuda et al.

[11] Patent Number: 5,844,736
[45] Date of Patent: *Dec. 1, 1998

[54] DUAL-MODE DIGITAL SIGNAL RECORDING AND/OR REPRODUCING APPARATUS

[75] Inventors: Shinichi Fukuda; Akio Tanaka, both of Kanagawa; Kentaro Odaka, Tokyo, all of Japan

[73] Assignee: Sony Corporation, Tokyo, Japan

[*] Notice: The term of this patent shall not extend beyond the expiration date of Pat. No. 5,615,055.

[21] Appl. No.: 822,331

[22] Filed: Mar. 20, 1997

Related U.S. Application Data

[63] Continuation of Ser. No. 383,710, Feb. 1, 1995, Pat. No. 5,615,055, which is a continuation of Ser. No. 170,685, Dec. 20, 1993, abandoned, which is a continuation of Ser. No. 824,226, Jan. 22, 1992, abandoned.

[30] Foreign Application Priority Data

Jan. 25, 1991 [JP] Japan ..................................... 3-025570
Jan. 25, 1991 [JP] Japan ..................................... 3-025571

[51] Int. Cl.$^6$ ....................................................... G11B 5/00
[52] U.S. Cl. .................................................. 360/8; 360/61
[58] Field of Search ................................... 360/8, 32, 39, 360/62, 61; 386/109, 112, 95, 96; 704/500, 503

[56] References Cited

U.S. PATENT DOCUMENTS

| | | | |
|---|---|---|---|
| 4,544,958 | 10/1985 | Odaka | 360/8 |
| 4,628,373 | 12/1986 | Takahashi et al. | 360/62 |
| 4,658,293 | 4/1987 | Arai et al. | 348/448 |
| 4,772,975 | 9/1988 | Azuma | 386/77 |
| 4,779,143 | 10/1988 | Oku et al. | 386/31 |
| 4,862,292 | 8/1989 | Enari et al. | 360/8 |
| 4,961,204 | 10/1990 | Tanaka et al. | 360/32 X |
| 5,065,259 | 11/1991 | Kubota et al. | 360/32 |
| 5,175,630 | 12/1992 | Tabuchi et al. | 360/64 X |
| 5,337,199 | 8/1994 | Arai et al. | 360/8 |

*Primary Examiner*—Andrew L. Zniezek
*Attorney, Agent, or Firm*—Jay H. Maioli

[57] ABSTRACT

A digital audio tape recorder for processing input signals in a predetermined manner and for digitally recording the processed signals on a recording medium or reproducing digital signals recorded on the recording medium by a rotary head has a time base compressing unit and a time base expanding unit for time base compressing signals supplied to the rotary head or time base expanding signals reproduced from the rotary head for recording and reproducing data at a high transmission rate on or from the recording medium. Time base compression/expenion and the rotation of the rotary head at a number of revolutions in conformity to the high transmission rate are achieved.

7 Claims, 7 Drawing Sheets

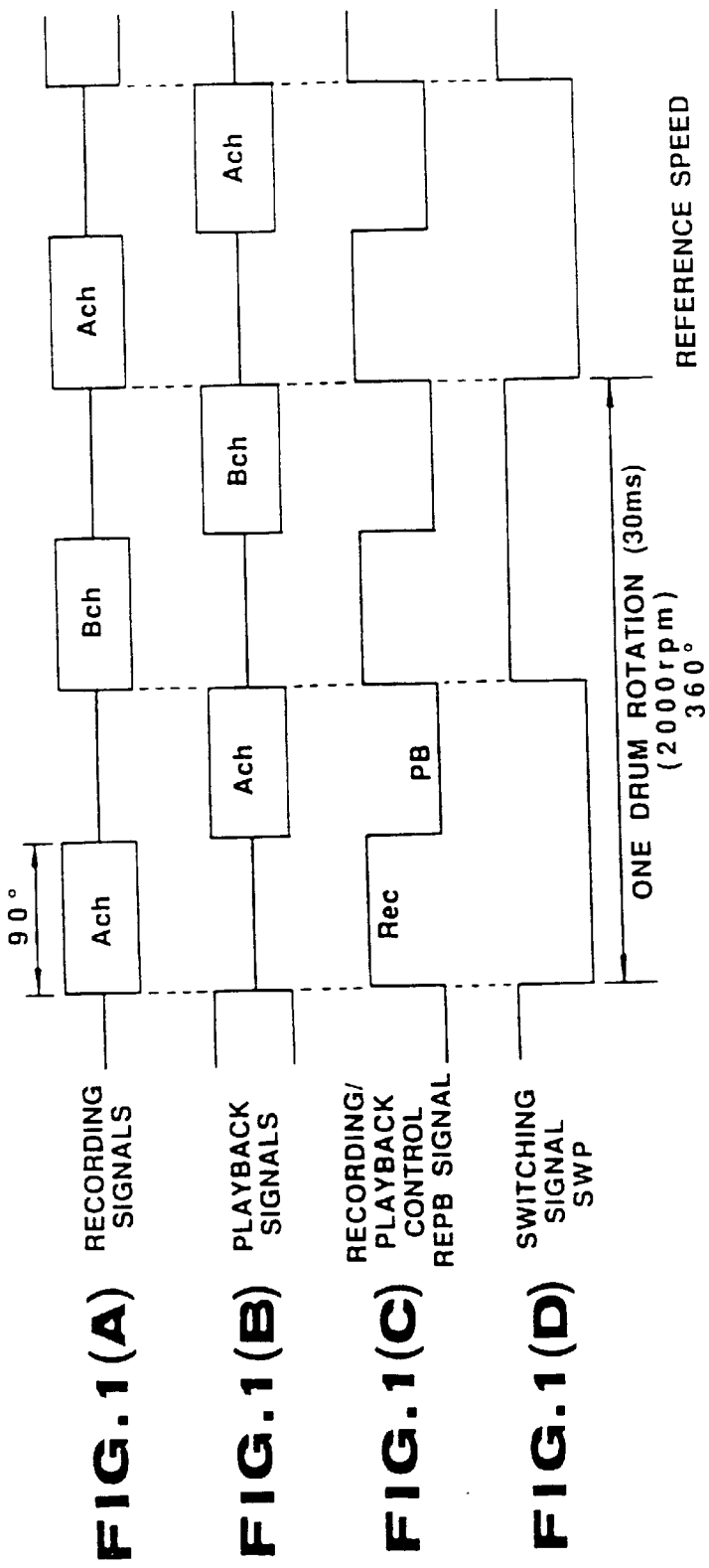
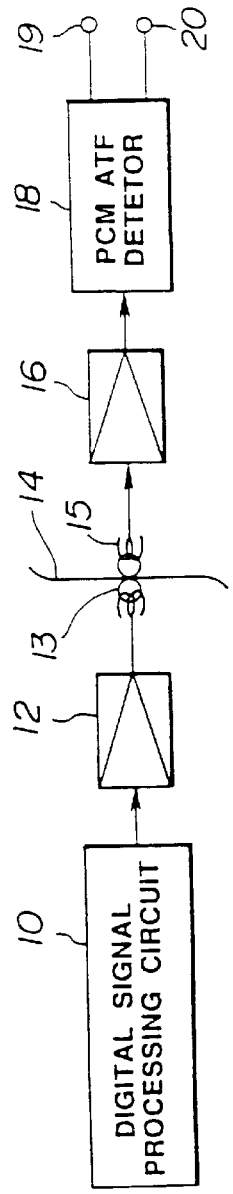
FIG.1(A) RECORDING SIGNALS
FIG.1(B) PLAYBACK SIGNALS
FIG.1(C) RECORDING/PLAYBACK CONTROL REPB SIGNAL
FIG.1(D) SWITCHING SIGNAL SWP
FIG.2 (PRIOR ART)

DUAL-MODE DIGITAL SIGNAL RECORDING AND/OR REPRODUCING APPARATUS

This is a continuation of application Ser. No. 08/383,710 filed Feb. 1, 1995, now U.S. Pat. No. 5,615,055, which is a Continuation of Ser. No. 08/170,685 filed Dec. 20, 1993, now abandoned, which is a Continuation of Ser. No. 07/824,226 filed Jan. 22, 1992, now abandoned.

BACKGROUND OF THE INVENTION

A rotary head type digital audio tape recorder, or so-called R-DAT, has been commercialized as a consumer digital/audio recording and/or reproducing apparatus. This R-DAT is produced as a system capable of coping with a plurality of sampling frequencies, and a variety of system specifications are prescribed in connection with the R-DAT.

Of these system specifications, the R-DAT standard drum specifications make use of a φ30 drum in which signal recording and/or reproduction is performed intermittently by two heads, that is, heads for channels A and B, using time base signal compression and expansion, with the tape wrap angle being 90°. Reference is had to a timing chart shown in FIG. 1(A)–1(D) for illustration.

A switching signal SWP, shown at D in FIG. 1(D), associated with the rotational phases of the φ30 drum, is a control signal for switching the heads in conformity to drum rotation. For example, if the switching signal SwP is at "L" or "H" levels, the A channel head and the B channel head are selected, respectively. A signal REPB, shown in FIG. 1C, indicates a control signal for signal recording or reproduction which has a period equal to one half the period of the switching signal and is used for signal recording or reproduction. During the "H" and "L" periods of the signal REPB, recording (Rec) and reproduction (Pb) are effectuated, respectively.

For signal recording, since the tape wrap angle on the drum is 90°, signal recording for each channel is made during an angular interval corresponding to one/fourth of a drum rotation of 360°, or 90°. Since two rotary heads of the present drum are arranged diametrically oppositely with respect to each other, i.e. at an angle of 180°, the start of recording of the channels is dephased 180° relative to each other. Thus the signals are recorded period of 180°, as shown at A in FIG. 1(A).

For signal reproduction, since the tape wrap angle on the drum is 90°, as for signal recording, as described hereinabove, signal reproduction for each channel is made during an angular interval corresponding to one/fourth of a drum rotation of 360° or 90°. Since two rotary heads of the present drum are arranged diametrically oppositely to each other, i.e. at an angle of 180° the, start of reproduction of the channels is dephased 180° relative to each other. Thus the signals are reproduced at a period of 180°, as shown in FIG. 1(B).

Meanwhile, the playback phase of each channel is set so as to be dephased by, for example, 90°, relative to the recording phase of each channel.

With the φ30 drum having two rotary heads, with the tape wrap angle on the drum being 90°, time base compression and expansion is effectuated in order to take account of the intermittent recording or reproduction shown in FIG. 1(A) or 1(B). Thus the effective recording or playback time on or from the recording medium is one half that for the tape wrap angle of 180°. Consequently, the instantaneous signal recording and reproducing rate within the time interval of actual recording or reproduction for each channel is twice that when the recording is effectuated with the tape wrap angle of 180°.

The R-DAT has a variety of signal recording/playback modes. The following are the specifications for, for example, standard modes among these modes. Thus, for audio PCM data, the number of channels, the sampling frequency and the number of quantization bits are prescribed to be 2 channels, 48 kHz and 16 bits, respectively. The standard mode is also termed a 48k-mode. Thus the audio PCM data transmission rate for the R-DAT is 1.536 Mbits (=48 kbits× 16×2). If the error correction code data and synchronization signals are added to the audio PCM data, the transmission rate becomes 2.4576 Mbits/second.

After 8/10 modulation, the transmission rate of 2.4576 Mbits/second becomes 3.072 Mbits/second. As regards the recording format on the tape, each track is composed of 196 blocks of the main area and the sub area. Main data inclusive of audio PCM data are recorded in 128 blocks of the main area of each track. Thus the recording rate of data in their entirety becomes 4.704 Mbits/second.

Meanwhile, in the above mentioned standard φ30 drum, signal recording or reproduction is effectuated at a tape wrapping angle of 90° for the head rotation of 180°, so that it is necessary to double the recording/ playback rate. Consequently, the ultimate recording/reproducing rate is 9.408 Mbits/second. Meanwhile, the number of revolutions of the drum is 2000 rpm or 200/6 Hz.

On the other hand, a φ15 drum is occasionally employed. The number of revolutions of the φ15 drum is 2000 rpm or 200/6 Hz, as in the φ30 drum, with the tape wrap angle being 180°, and recording and/or reproduction is effectuated using two rotary heads. Thus the data transfer rate is 4.704 Mbits, in distinction from that for the tape wrap angle of 90°.

FIG. 2 shows, in a block diagram, a rotary head-digital audio tape recorder (R-DAT) employing the φ30 and φ15 drums; and FIG. 2A shows the 30 mm drum in detail, including the record head 15a, the reproduce head 13a, and the tape 14.

Input signals to be recorded on a magnetic tape 14 are processed in a predetermined manner by a digital signal processing circuit 10 and thence supplied to a recording amplifier 12 before being recorded on the recording tape 14 as the recording medium. On the other hand, data recorded on the magnetic tape 14 are transmitted to a playback amplifier 16 via a rotary head 15. The playback signals from the playback amplifier 16 are transmitted to a PCM-ATF (automatic track following) signal detector 18, which outputs pilot signals and RF detection signals to output terminals 19 and 20.

Besides the above mentioned standard mode, there is also a mode characterized by the sampling frequency of 32 kHz and prolonged recording and reproduction. This mode is also termed a 32k-LP mode. With the 32k-LP mode specifications, recording and reproduction is effectuated with the number of channels of 2 channels, the sampling frequency of 32 kHz and the number of quantization bits of 12 bits. In distinction from the recording/playback rate for the above mentioned standard mode, the recording/playback rate for the 32k-LP mode is $$2CH \times 32 \text{ kHz} \times 12 \text{ bits} = 0.768 \text{ Mbits/second.}$$

Therefore, if recording or monitoring of recording is effectuated under this mode, the digital recording and/or reproducing apparatus effectuates recording and/or reproduction within a time interval which is twice that under the standard mode.

With the R-DAT, circuit designing is made in association with the respective system standards, as described hereinabove.

The R-DAT is also contemplated to be used in future as a computer data backup device or as a data recorder.

If the R-DAT is used for such application, a higher recording/playback rate is desired.

The recording/playback rate of the R-DAT may be improved further by elevating the number of revolutions of the drum and the tape running speed while the standard for the tape recording format including the track pitch or the like remains satisfied.

In the case of the $\phi$15 drum, with the tape wrap angle being 180°, if the number of revolutions of the drum is doubled to (400/6) Hz, the recording/playback rate on or from the magnetic tape as the recording medium becomes 9.408 Mbits/second, which is the recording/playback rate for the $\phi$30 drum with the tape wrap angle of 90°. In this manner, the recording/playback rate may be improved easily by employing existing LSIs.

However, if the recording/playback rate is to be increased by a factor of, for example, two, with the use of the $\phi$30 drum having the tape wrap angle of 90°, the recording/playback rate becomes 18.816 Mbits/second, which is double the above mentioned recording/playback rate of 9.408 Mbits/second. The LSIs cannot be realized with this recording/playback rate because the PLLs or the MODEM circuits of the existing LSIs constituting the digital signal processing circuit 10 shown in FIG. 2 are not up to such elevated recording/playback rate. That is, from both the development costs and technical aspects, it is extremely difficult to produce LSIs capable of coping with the doubled recording/playback rate.

Besides, when it is desired to use the same mechanism for a variety of recording/playback rates or data transmission rates, it becomes necessary to reconstruct major portions of the circuit or modify and switch predetermined portions thereof in conformity to the respective recording/playback rates.

Above all, it is difficult to switch PLLs or analog time constants of equalizers or the like in the analog signal processing circuit of the reproducing system.

In short, a plurality of recording/reproducing rates can be realized with the same mechanism only with difficulty because the existing PLLS or MODEM circuits are not up to these various rates.

That is, from both production costs and technical aspects, it is extremely difficult to produce LSIs capable of realizing digital processing in conformity to these various rates.

SUMMARY OF THE INVENTION

In view of the above described status of the art, a circuit for time base compressing recording signals supplied to a recording head and a circuit for time base expanding signals reproduced from a playback head are provided in a recording system and in a playback system, respectively. Switching means are provided for switching between high transmission rate recording signals time base compressed by the time base compression means provided in the recording system and signals not time base compressed by the time base compression means, while switching means are provided for switching between playback signals time base expanded by a time base expansion circuit provided in the playback system and signals not time base expanded by the time base expanding means. In accordance with the present arrangement. the data transmission rate on or from the recording medium may be increased by increasing the data transmission rate and effecting time base compression of signals supplied to the recording head of an existing digital signal recording and/or reproducing apparatus and by lowering the data transmission rate and effecting time base expansion of output signals from the playback head of the recording and/or reproducing apparatus.

The digital recording and/or reproducing apparatus according to the present invention includes time base compressing means for time base compressing and elevating the data transmission rate of recording signals supplied to the recording head, switching means for bypassing the time base compressing means, time base expanding means for time base expanding and lowering the transmission rate of output signals from the playback head, and switching means for bypassing the time base expanding means. Meanwhile, in controlling the switching means, switching means provided in the recording system and switching means provided in the playback system are switched by an external control signal. That is, when signals are time base compressed during recording and time base expanded during reproduction, an output signal from time base compressing means and an output signal from time base expansion means are used, respectively. Control may also be made for bypassing the time base compressing means and/or the time base expanding means by the switching means.

BRIEF DESCRIPTION OF THE DRAWINGS

FIGS. 1(A)–1(D) are timing charts showing data recorded on or reproduced from a recording medium in a rotary head digital audio tape recorder.

FIG. 2 is a schematic block diagram showing a conventional rotary head digital audio tape recorder and FIG. 2A shows the 30 mm drum.

DETAILED DESCRIPTION OF THE INVENTION

Figure 3:
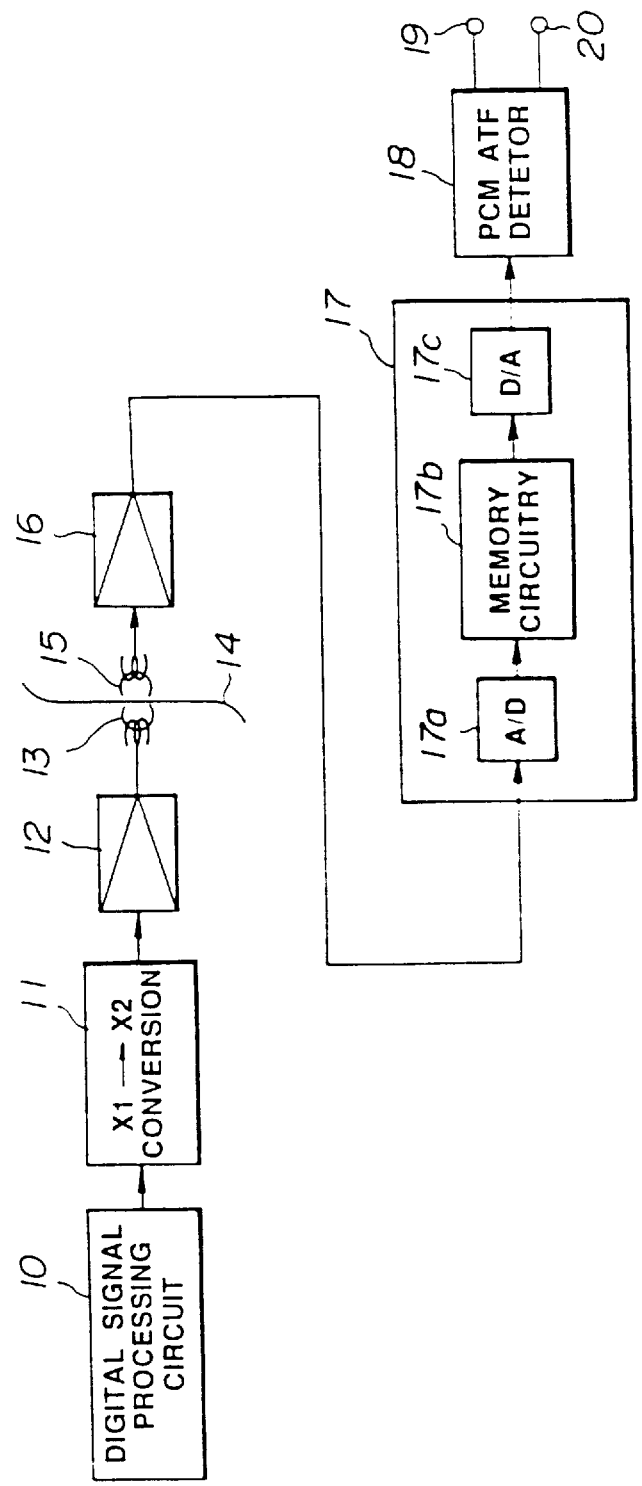
FIG. 3 is a schematic block diagram showing a first embodiment of the present invention.

By referring to the drawings, illustrative embodiments of the present invention will be explained in detail.

The digital recording and/or reproducing apparatus according to a first embodiment of the present invention will be explained by referring to FIG. 3, in which the components which are the same as those used in FIG. 2 are denoted by the same reference numerals.

As mentioned previously, the typical data transmission rate for audio PCM data in the reference rate standard mode is 1.536 Mbits/second. When the data are added to by parity data for error correction or synchronization signals, the data transmission rate becomes 2.4576 Mbits/second. After 8/10 modulation, the data transmission rate becomes 3.072 Mbits/ second. If the digital data are recorded in 128 blocks of the main area among 196 blocks in each track, the data recording/reproducing rate on or from the recording tape (mean rate) becomes 4.704 Mbits/second.

Thus, when it is desired to record and/or reproduce data at a rate which is double the above mentioned mean recording/reproducing rate, the data recording/reproducing rate becomes 9.408 Mbits/second, which is double the above mentioned mean rate.

The output double rate recording signals are supplied from the digital signal processing circuit 10 as known per se to a time base compression converter 11 of the present invention which is adapted for time base compression and elevation of the data transmission rate.

The recording signals having the above mentioned recording/reproducing rate are converted by the time base compression converter 11 into signals having the double recording/reproducing rate of 18.816 Mbits/second.

The time base compressed data are transmitted to a recording amplifier 12. Output signals from the recording amplifier 12 are recorded on a magnetic tape 14 as a recording medium by means of a rotary head 13 as a recording head used for recording the signals. Data recorded on the magnetic tape 14 are read by a rotary head 15 as a playback head before being transmitted to a playback amplifier 16 which outputs reproduced signals at a transmission rate of 18.816 Mbits/second.

A time base expansion converter 17 time base expands output signals from the playback amplifier 16 for resetting the data transfer rate to the original rate of 9.408 Mbits/ second.

The time base expanding converter 17 is provided with an A/D converter 17a, a memory circuit section 17b and a D/A converter 17c for time base expanding output signals from the playback amplifier 16 in an analog signal configuration. The playback signals are transmitted through these circuit components before being supplied to a PCM/ATF signal detector 18, as known per se, which is digital processing means for digitally processing the playback signals. The detector 18 outputs pilot signals and RF detection signals to output terminals 19 and 20, respectively.

By providing the time base compressing converter 11 and the time base expanding converter 17 in the recording system and the playback system, respectively, digital recording and/or reproduction may be effectuated with the aid of LSIs currently employed in digital signal recording and/or reproducing apparatus in conformity with the recording/ playback rates which are in excess of the recording/playback rate disposable with the LSIs, such as 9.408 Mbits/second.

Referring to FIG. 4(A)–4(F), the principle of performing time base compression and expansion with the aid of the existing LSIs is hereinafter explained.

As mentioned previously, the mean data transmission rate on or from the recording tape under the reference rate of the standard mode is 4.704 Mbits, as an example.

For recording and/or reproduction at double the reference recording/playback rate, the data transmission rate on or from the recording tape becomes 9.408 Mbits/second. Referring to FIG. 3, the double rate recording signals are transmitted from the digital signal processing circuit 10 to the time base compressing converter 11.

Figure 4:
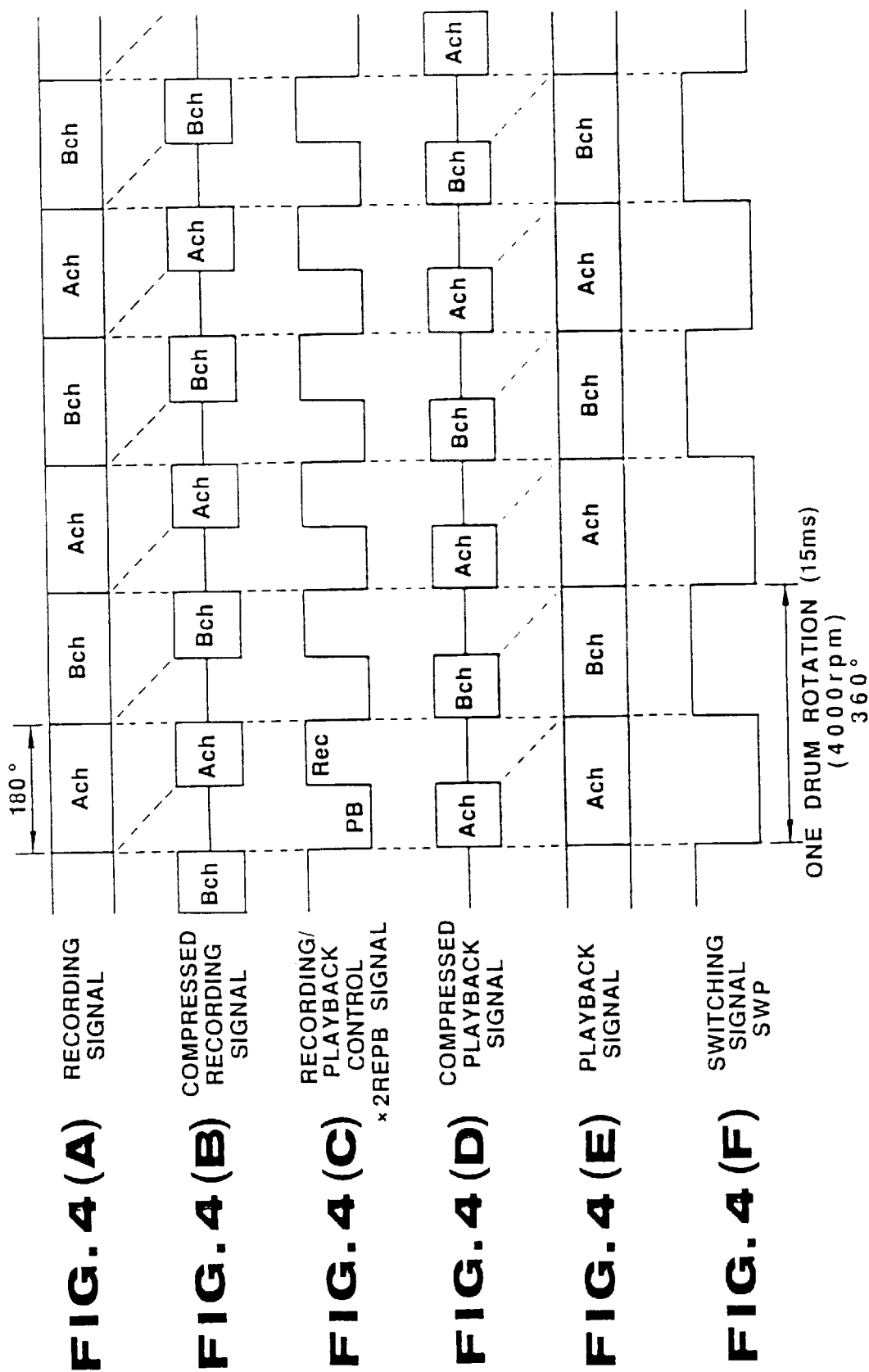
FIG. 4(A)–4(F) are timing charts for recording/playback signals for the embodiment shown in FIG. 3.

The digital signal processing circuit 10 is provided with an LSI which is adapted for continuously supplying recording signals to channels A and B by consecutive amounts each corresponding to 180° rotation of the heads, as shown in FIG. 4A, and which is capable of processing signals at a recording/reproducing rate of up to 9.408 Mbits per second which can be coped with by the existing LSIs.

If a track formed by each complete head revolution corresponds to one block, the time base compressed signals shown in FIG. 4B are compressed one-block recording signals, so that the recording time of the recording signals shown in FIG. 4(A) is halved as a result of time base compression.

The drum is a φ30 drum, provided with two rotary heads, with the tape wrap angle being 90°. The drum is operated at a rate of 400/6 Hz, which is double the rotational speed of the conventional drum. The switching signals SWP as control signals and the recording/playback control signals X2REPB are controlled in conformity to the double rate drum rotation, as shown and F in FIG. 4(C) and 4(F).

Input signals to the channels A and B are controlled by the switching signals. Control is made so that the input signals are supplied to the channels A and B for the "L" and "H" levels of the switching signals SWP, respectively, as shown in FIG. 4(F).

The transmission rate in each channel is increased by time base compressing converter 11 to 18.816 Mbits/second which is double the recording/playback rate of 9.408 Mbits/ second which can be coped with by the existing LSIs. The time base compressed signals, outputted from the converter 11, are transmitted by means of recording amplifier 12 to the rotary head 13 before being recorded by means of the rotary head 13 on the recording tape 14 as the recording medium.

Similarly, the data recorded with time base compression on the recording tape 14 as the recording medium are taken out for reproduction by means of the rotary head 15 so as to be supplied to the playback amplifier 16. These time base compressed signals are transmitted to the time base expanding converter 17 at a transmission rate of 18.816 Mbits/ second.

In the time base expanding converter 17, time base compressed signals are generated during the time periods corresponding to the "L" periods of the X2REPB signals, which are used for controlling signal recording and reproduction, as shown in FIG. 4(D). That is, the operation effectuated in the time base expanding converter is the reverse of that effectuated in the time base compressing converter 11. The time base compressed signals, reproduced by means of the rotary head 15 and the playback amplifier 16, are time base expanded by the time base expanding converter 17 so that the transmission rate is halved to 9.408 Mbits/second which is capable of being coped with by the existing LSIs, whilst playback signals corresponding to 180° head rotation are placed continuously end to end and allocated without vacancies to the channels A and B.

Meanwhile, during reproduction, playback signals are outputted alternately and continuously from the channels A and B. These playback signals are supplied via analog equalizer and PLLs for clock extraction to the PCM/ATF detector 18 constituting a digital signal processing LSI.

The foregoing refers to the signal timing related with time base compression and expansion employed in the digital recording and/or reproducing apparatus according to the present invention.

Meanwhile, the foregoing description has been made of a φ30 drum, having two rotary heads, with a tape wrap angle for recording being 90°.

With the φ15 drum, the recording/playback rate is 9.408 Mbits, capable of being coped with by the existing LSIs, despite the fact that the data transmission rate to the recording tape is doubled, as mentioned hereinabove, so that the doubled transmission rate can be coped with.

Figure 5:
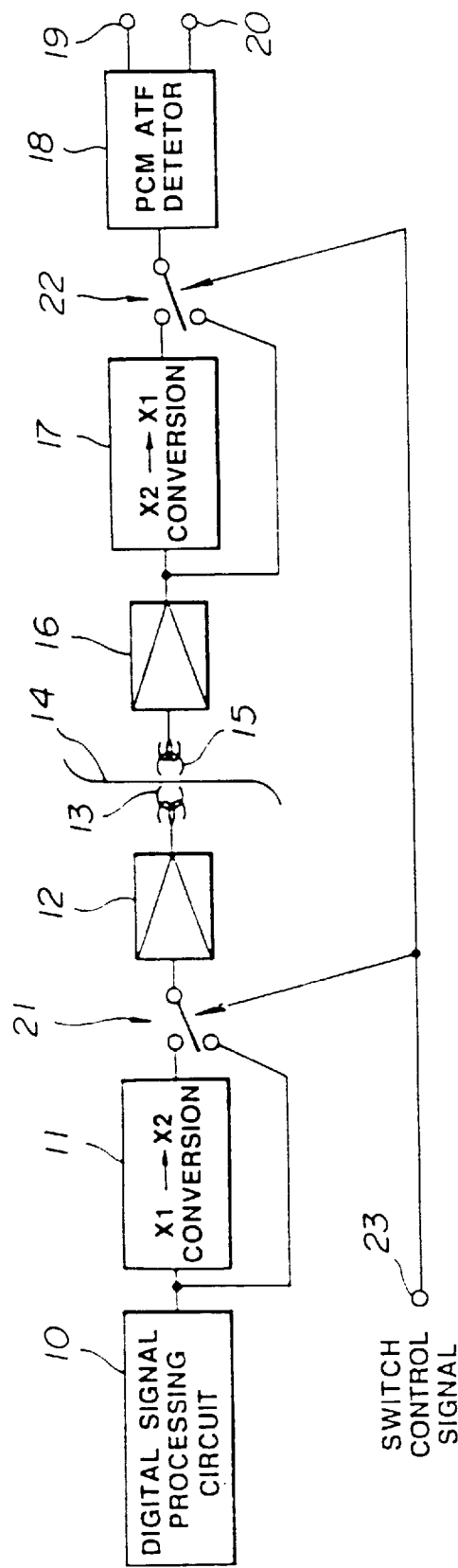
FIG. 5 is a schematic block diagram showing a second embodiment of the present invention.

Referring to FIG. 5, a second embodiment of the present invention will be explained. In FIG. 5, the parts or components which are the same as in FIGS. 2 and 3 are depicted by the same reference numerals.

In the present second embodiment, switching means 21, 22 are provided for bypassing the time base compressing converter 11 and/or the time base expanding converter 17. That is, the control switch 21 is provided for switching between an output signal from the digital signal processing circuit 10 and the time base compressed output signals from the compressing converting means 11 by an external switching control signal which is supplied by means of an input terminal 23 and which is simultaneously used for switching the number of drum revolutions in a manner not shown.

An output signal from the control switch 21 is supplied to the recording amplifier 12. An output signal from the recording amplifier 12 is recorded on the recording tape 14, as a recording medium, by means of the recording head 13 used for recording on the recording medium. Data recorded on the magnetic tape 14 are read by the rotary head 15. Output signals from the rotary head 15 are delivered to the playback amplifier 16. Meanwhile, the transmission rate of the output signals from the playback amplifier 16 is 18.816 Mbits/second.

An output signal from the playback amplifier 16 is supplied to the time base expanding converter 17 and to one of input terminals of the control switch 22 which is switched by the external switching control signal. The converter 17 time base expands the time base compressed signals. Output signal from the time base expanding converter 17 are outputted to the other input terminal of the control switch 22.

The switching state of the control switch 22 is changed over simultaneously with that of the control switch 21 by the switching control signal supplied from outside by means of the input terminal 23. An output from the control switch 22 is supplied to a PCM/ATF detector 18. If the input signals are time base compressed, using the time base compressing converter 11, before being recorded on the magnetic tape, the switch 21 is; controlled by the control signal supplied to the terminal 23 so that output signals from the time base compressing converter 11 are supplied to the amplifier 12, while the drum, not shown, is rotated at a speed of 400/6 Hz which is double the standard rotational speed. For reproducing the time base compressed signals, the switch 22 is controlled by the control signal supplied to the input terminal 23 whereby the output signal from the time base expanding converter 17 is supplied to the PCM/ATF detector 18, at the same time that the drum, not shown, is rotated at a speed of 400/6 Hz which is double the standard rotational speed.

On the other hand, if data are recorded or reproduced at the reference data transmission rate, the control switches 21, 22 are controlled by the control signal supplied at the input terminal 23 for bypassing the time base compressing converter 11 and the time base expanding converter 17. The rotational speed of the drum is controlled at this time to the reference speed of 2000 rpm or 200/6 Hz.

Meanwhile, the above mentioned control from outside is effectuated under the command of a microcomputer.

The method of converting the signal transmission rate by time base compression and-expansion with the signal timing shown in FIGS. 4(A)–4(F) is hereinafter explained.

With the wrap angle of the magnetic tape on the drum of 90°, the recording signals are outputted from the digital signal processing circuit 10 of the recording system at a transmission rate of 9.408 Mbits which is twice that with the tape wrap angle of 180°. Since the time consumed in reading each track is 7.5 ms, 9.408 Mbits/second×7.5 ms=70560 bits (=1 field) are necessitated as a RAM capacity for time base compression at the time base compressing converter 11, if one-track data are to be stored.

However, the time base compressing converter 11 outputs the above mentioned recording signals after rate conversion to 18.816 Mbits/second, which is four times the mean signal transmission rate for the standard reference rate mode of 4.704 Mbits/second.

Also, in the reproducing system, time base compressed signals from the playback amplifier 16 are supplied to the time base expanding converter 17 at the transmission rate of 18.816 Mbits/second which is four times the reference rate of the standard mode. These time base compressed signals are recorded in the memory by means of an A/D converter which will be explained subsequently.

Meanwhile, with the transmission rate of the reproduced time base compressed signal of 18.816 Mbits/second, the waveform has the maximum frequency of 9.408 MHz in terms of the signal frequency. As is apparent from Nyquist's sampling theorem, the sampling frequency of 18.816 MHz, which is double the above mentioned maximum frequency, or higher, is required of the A/D converter.

In actual circuit configuration, low-pass filters (LPFs) are provided ahead and back of the A/D converter. These LPFs are responsible for phase rotation of the digital waveform. In order to render the digital waveform phase irrelevant by taking account of the phase rotation, the sampling frequency at the time of storage in the memory is preferably at least 27 to 28 MHz for a more favorable error rate.

The data A/D converted with this sampling frequency are sequentially recorded in the memory. The data thus recorded in the memory are read from the leading address in the memory at a frequency which is one half the sampling frequency, so that the data transmission rate is halved.

That is, the transmission rate of the data read from the memory is one half the transmission rate at the recording side of 18.816 Mbits/second, or 9.408 Mbits/second.

Although the recording on the memory is completed in a time equal to one-fourth that required for one drum rotation, the readout rate is halved, so that the recording on the memory is completed in a time interval equal to one half that required for one drum rotation.

A memory capacity sufficient to store at least one half the one-track data capacity is required of the memory employed in the reproducing system, depending on the sampling frequency of the A/D converter.

For example, for time base expanding 8-bit data processed by A/D conversion with the above mentioned sampling frequency of 28 MHz, by means of two memories, a RAM capacity of 28 MHz×8 bits×7.5 ms/2/2=420000 bits= 52.5 k words per memory is necessitated.

On the other hand, the number of quantization bits of the A/D converter of at least 6 bits is required for maintaining acceptable accuracy.

Figure 6:
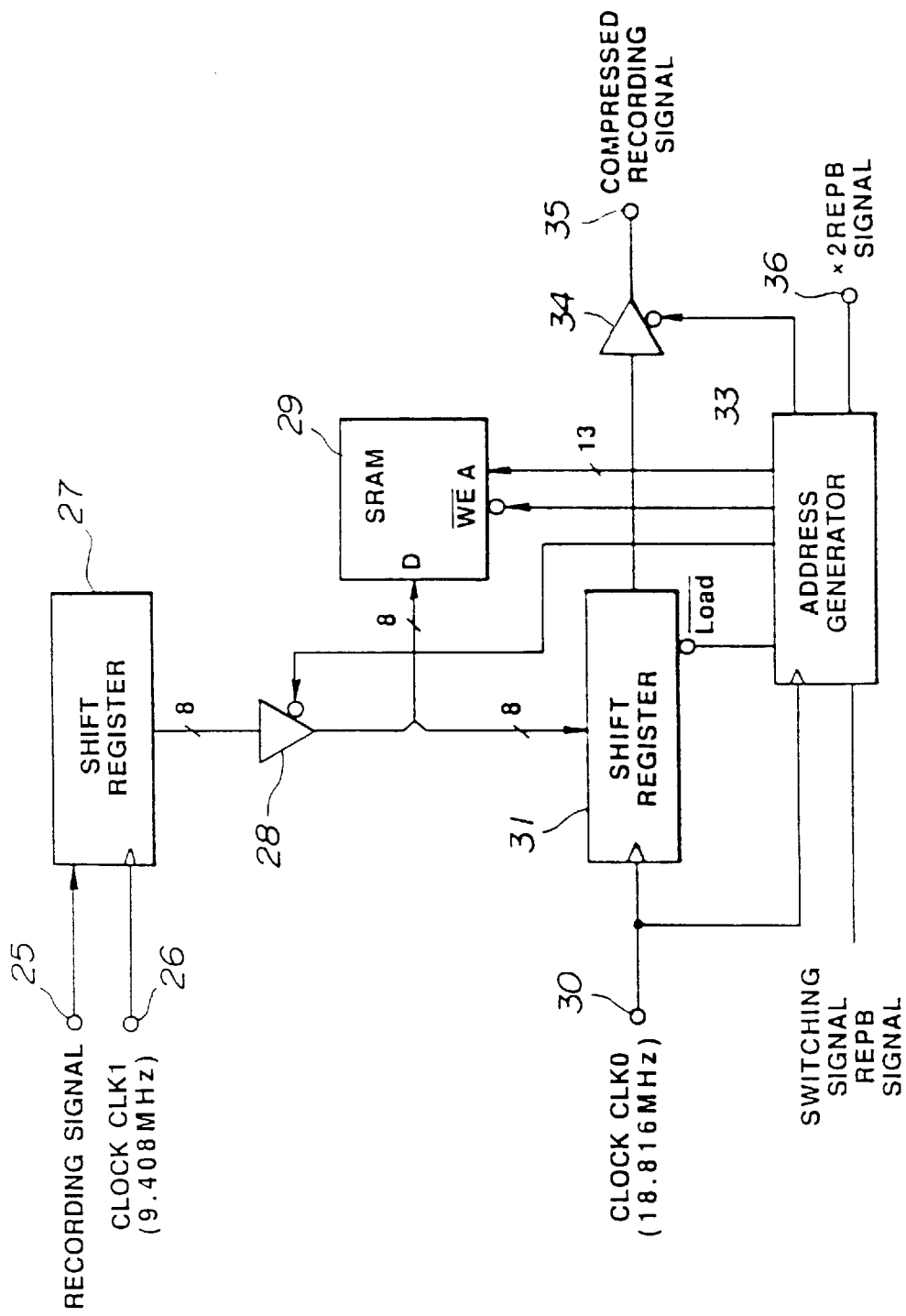
FIG. 6 is a circuit diagram showing a time base compression circuit for signal recording according to the present invention.
Figure 7:
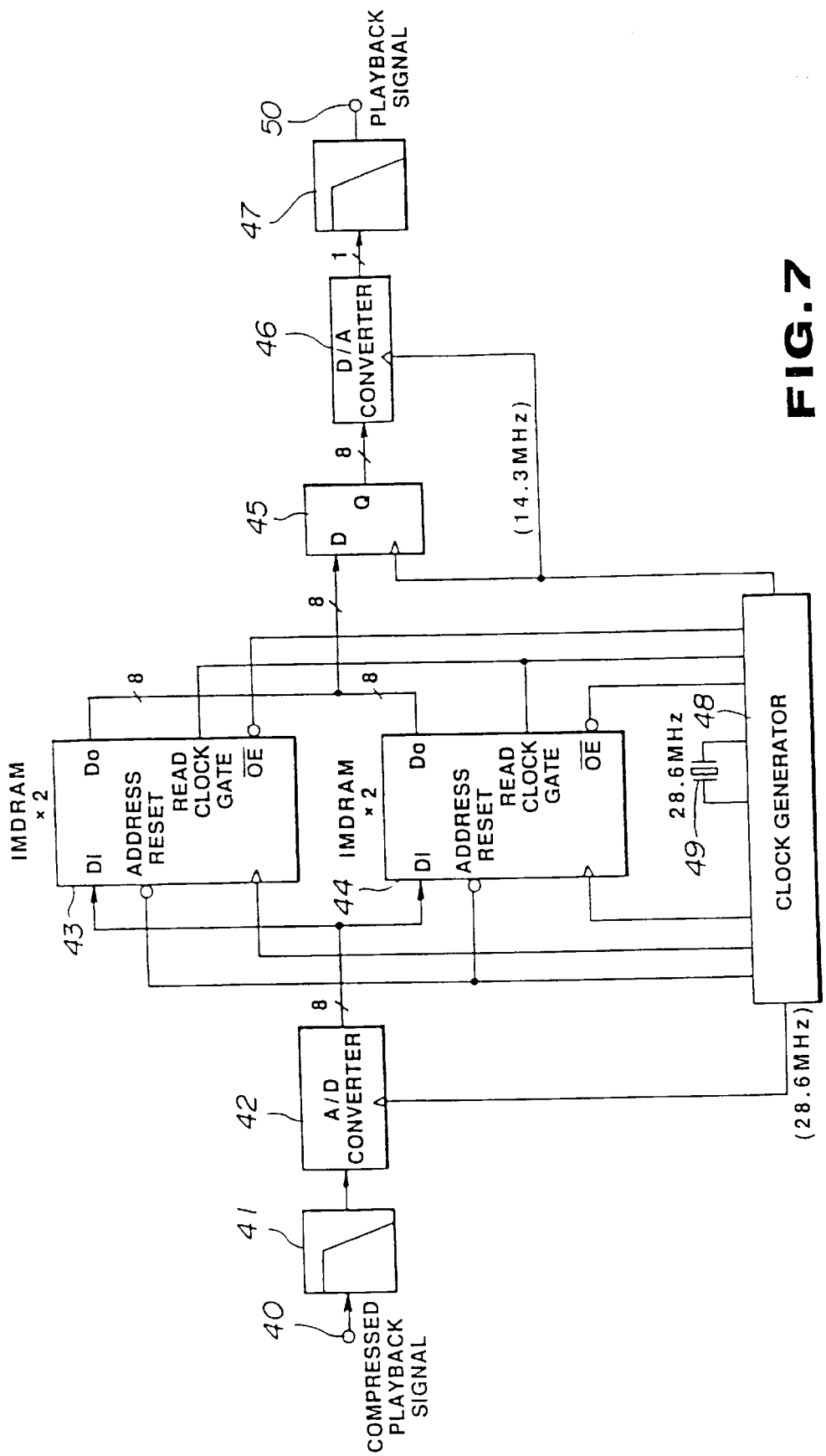
FIG. 7 is a time base expansion circuit for signal reproduction according to the present invention.

On the basis of the above described method, the time base compressing converter of the recording system and the time base expanding converter of the reproducing system are explained by referring to FIGS. 6 and 7, respectively.

Referring first to FIG. 6, the recording signal with the mean rate of 9.408 Mbits/second are inputted to a shift register 27 via an input terminal 25. Clocks CLK1 having the clock frequency of 9.408 MHz corresponding to the above mentioned double mean rate is supplied to the shift register 27 via an input terminal 26. Clocks CLK0 having the clock frequency of 18.816 Mhz corresponding to double the transmission rate are supplied to a shift register 31 and an address generator 33 via an input terminal 30.

The address generator 33 is supplied with switching signals and recording/reproducing control signals REPB. Based on these signals and clocks CLKO, the address generator 33 supplies the aforementioned control signals for controlling various circuits.

The shift register 27, supplied with the above mentioned recording signals, is used for converting serial data into parallel 8-bit data for recording in a static RAM 29 by means of a buffer 28 provided with an enable input. The parallel 8-bit data are written in the static RAM when the signal supplied from the address generator 33 to a write enable terminal WE is at the "L" level. Data are written on the basis of 13-bit address signals supplied at a slow timing of one-eighth the clocks CLK1 at an input terminal A to which an address bus is connected from the address generator 33.

Besides the above mentioned control signals, a load signal for controlling data loading to the shift register 31, and an enable signal for indicating whether or not the ultimate output of the time base converter of the recording system is in the operating state, are supplied by to the address generator 33.

The X2REPB signal, which is the recording/reproducing control signal for doubling the transmission rate, is outputted from the address generator 33.

During the period other than the active period of the signal supplied to the write enable terminal WE, the data written in the static RAM 29 are sequentially supplied as 8-bit data, from the leading address first, with the cycle equal to one half the writing cycle, as the readout cycle.

When the load signal supplied from the address generator 33 is at the "L" level, the shift register 31 is loaded with the 8-bit parallel data and, after bit shifting with the clocks CLK0 having the above mentioned frequency of 18.816 MHz/second, transmits serial data to a buffer 34 provided with an enable terminal, in the form of a standard mode mean reference rate compressed recording signal. When the enable terminal is at the "L" level, the buffer 34 outputs this time base compressed signal to output terminal 35.

Although the static RAM is required to have a RAM capacity of 70560 bits per field, the number of the readout addresses may be halved by reading out data at the double frequency, so that the capacity of 35280 bits or more suffices. Thus a 64 Kbit memory chip is used as the RAM. Data are written in accordance with sequential addresses by computing the leading address with the capacity indicated by all "1" of the last 13-bit address as a unit. Data readout is started at double the rate when one half the entire recording data has been recorded. That is, the number of readout addresses supplied from the address generator may be halved and the number of the halved readout addresses is equal to the number of the write addresses.

The time base expanding converter circuit of the reproducing system is explained by referring to FIG. 7.

The capacity of the memory used during reproduction is changed with changes in the sampling frequency of the A/D converter, as mentioned previously. Thus it may be contemplated that the memory circuit employed may be diversified in construction.

Time base compressed signals are entered by means of an input terminal 40. These compressed signals are supplied to an A/D converter 42 via a bandwidth-limiting filter 41. An LPF 41 has a passband of 14 MHz.

The time base compressed signals are entered to the A/D converter 42.

A clock generator 48 has a quartz oscillator 49 having an oscillation frequency of 28.6 MHz. The clock generator 48 transmits the frequency of 28.6 MHz as a sampling frequency for the A/D converter 42. The A/D converted signals are outputted as 8-bit signals.

The 8-bit output data from the A/D converter 42 are supplied to memories 43, 44.

If a dynamic RAM having a longer memory cycle time than the cycle time of the A/D converter 42 is used, a pair of memories need to be provided so that the respective data are alternately supplied to the memories for assuring the time necessary for memory processing.

These memories are shown at 43, 44 in FIG. 7. A memory capacity not less than 28.6 Mbit/second×8 bits×3.75 ms/2= 429000 bits is necessary for each RAM. The time base expanding converter shown in FIG. 7 includes a FIFO type dynamic RAM having a capacity of 1 Mbits. Since the 1M bit FIFO dynamic RAM has only 4 data bits, two of the memories are provided side by side for dealing with 8-bit data. That is each of, the memories 43, 44 indicate a set of two 1M bit dynamic RAMs.

The 8-bit signals supplied from the A/D converter 42 are supplied to an input terminal $D_i$ of each of the dynamic RAMs 43, 44.

14 MHz clocks are supplied to this dynamic RAM 43 from a clock generator 48 for storing data in RAM 43. Similarly, 14 MHz clocks phase-delayed by one half with respect to the 14 MHz clocks supplied to the dynamic RAM 43 are supplied to the dynamic RAM 44 for storing data in RAM 44.

The clock generator 48 also supplies address reset signals to a 1 Mbit FIFO dynamic RAM 43.

Data outputs from the above mentioned 1 Mbit FIFO dynamic RAMs 43, 44 are outputted at output terminals $D_0$ when the output enable signal OE supplied from the clock generator 48 is at the "L" level in dependence upon the conditions of the read clock gate connected to the clock generator 48.

Although not shown, the conditions of the read clock gates of the memories 43, 44 are such that, for alternately accessing the memories 43, 44, the read clock gate signals are inverted in signal level at a set of input terminals of one of these memories.

The 8-bit data obtained by alternately accessing the 1M bit FIFO dynamic RAMs 43, 44 are transmitted to an input terminal of a D-flipflop 45. The data are maintained in the D-flipflop 45 by 14.3 MHz clocks supplied thereto from the clock generator 48. The data are outputted from an output terminal Q of the D-flipflop 45 to a D/A converter 46 at the rise timing of the next clock.

The D/A converter 46 sequentially converts digital signals into analog signals at the timing of 14.3 MHz clocks supplied from the clock generator 48.

In this manner, the time base of the time base compressed signals is expanded by a factor of two.

The output signals from the D/A converter 46 are supplied to an LPF 47 for bandwidth limitation. The LPF 47 has a passband of 7 MHz.

The output signals from the LPF 47 are outputted as time base expanded playback signals at an output terminal 50. These playback signals are further supplied to the PCM/ATF detector 18.

Figure 8:
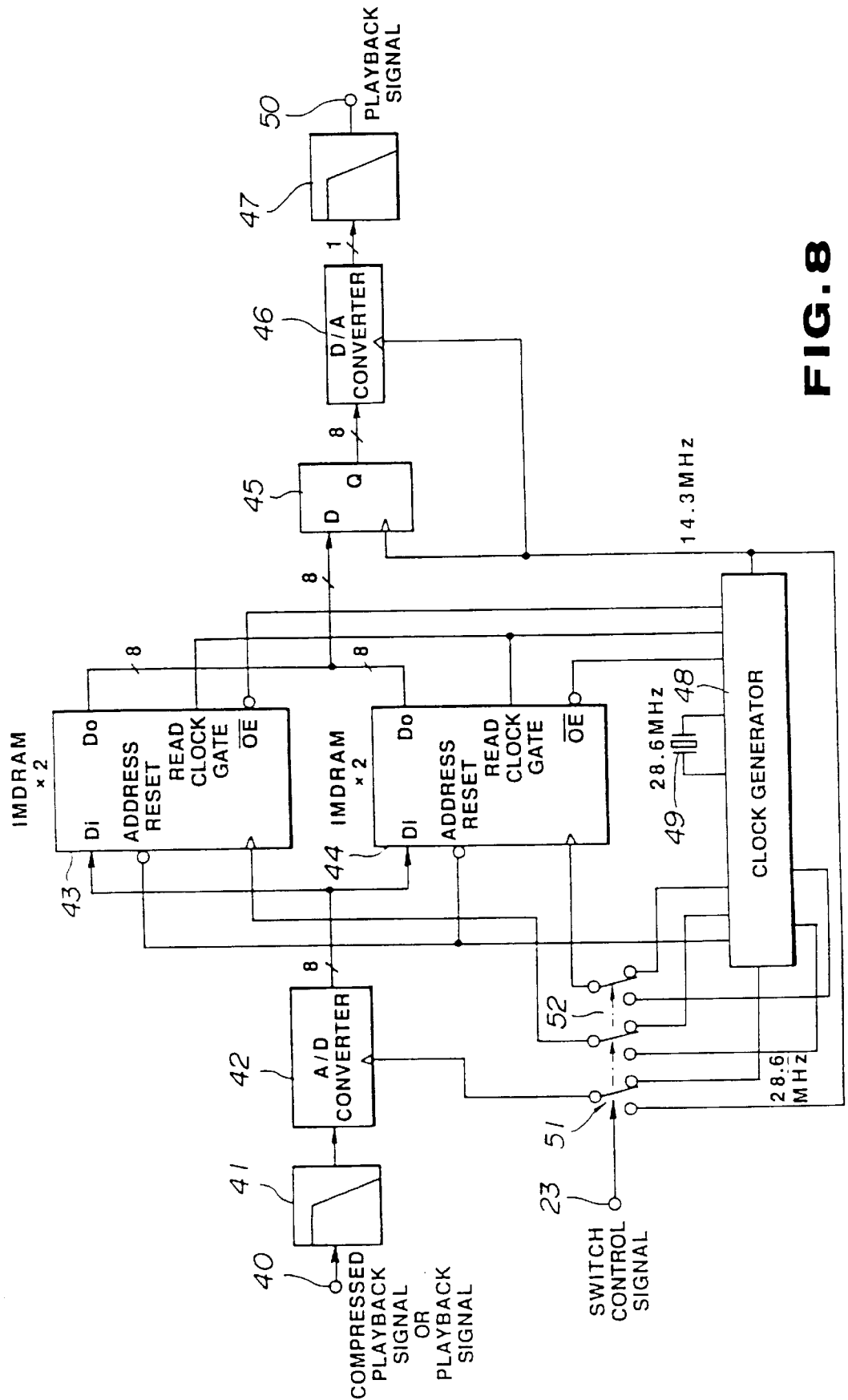
FIG. 8 is a circuit diagram showing a modified time base expansion circuit for signal reproduction according to the present invention.

Referring to FIG. 8, a time base expanding converter of the reproducing system according to a modified embodiment of the present invention will be explained.

In the embodiment of FIG. 5, the data transmission rate is changed over by providing the control switch 22 for changing over the recording/reproducing rate of the reproducing system in the time base expanding converter circuit of the reproducing system.

Thus the circuit construction of FIG. 8 is substantially similar to that shown in FIG. 7 and hence the parts or components which are the same as those Shown in FIG. 7 are indicated by the same reference numerals.

With the present circuit, clocks from the clock generator 48 are changed over depending on whether or not the signals inputted to a low-pass filter 41 are the time-base compressed signals.

Clocks supplied to the A/D converter 42 or to the 1 Mbit dynamic RAMs 43, 44 are changed over in conformity to the transmission rates of the input signals.

For this reason, control switches 51, 52 are provided as clock switching means in the time base expanding converter circuit 17 of the reproducing system. These control switches 51, 52 are switched in unison by external switch control signals, as in the preceding embodiment.

The switch control signal supplied at the terminal 23 is changed over so that, when the time base compressed signal is supplied to the A/D converter 42, a signal of the frequency of 28.6 MHz is supplied to the control switch 51 and, when the time-base uncompressed signal is supplied to the A/D converter 42, a signal of the frequency of 14.3 MHz is supplied to the control switch 51.

Meanwhile, the effects similar to those described above may be obtained if, in the present time base expanding converter circuit, the clocks supplied from the clock generator 48 to the read clock gates of the 1 Mbit dynamic RAMs 43, 44, D-flipflop 45 or to the D/A converter 46 are changed over by the external switch control signal.

By providing the time base compression converter and the time base expanding converter as described hereinabove, recording and/or reproduction may be effectuated at a high recording/reproducing rate, even though the LSIs having only the ordinary data transmission rate is employed. In addition, the time base compressing and expanding operations may be selected by changing over the state of the control switch in conformity to the input data transmission rate.

What is claimed is:

1. A digital signal recording apparatus for recording digital signals processed by a signal processing circuit on a magnetic tape in a first or second mode by supplying signals to be recorded through a signal recording rotary drum via a recording amplifier, comprising:

a time base compression circuit for performing time base compression of said signals processed by said signal processing circuit, output signals from said time base compression circuit being supplied to said recording amplifier in said second mode, said signal recording rotary drum including two rotary heads arranged within said drum and said drum having a diameter of 30 mm and a tape wrap angle of 90°, said drum rotating at a second revolution rate in said second mode in conformity to the time base compression performed by said time base compression circuit; and signal switching means for bypassing said time base compression circuit in said first mode upon receipt thereby of a switching control signal that is also employed to control the rotary drum revolution rate, said signals processed by said signal processing circuit being supplied to said recording amplifier when said rotary drum is rotating at a first revolution rate in said first mode, and said time base compressed signal from said time base compression circuit being supplied to said recording amplifier in said second mode when said rotary drum is rotating at said second revolution rate greater than said first revolution rate;

said time base compression circuit including memory means for receiving and storing the digital signals to be supplied to said recording amplifier and an address generator responsive to control signals input thereto for controlling the memory means to read in and read out the digital signals at time periods such that a ratio of a read in rate to a read out rate is less than 1.

2. The digital signal recording apparatus of claim 1, wherein said time base compression circuit further includes a shift register for receiving the digital signals and supplying the digital signals in the form of parallel 8-bit data to the memory means to be read in and read out under the control of the address generator.

3. The digital signal recording apparatus of claim 1, wherein said memory means is a static RAM.

4. A digital signal reproducing apparatus in which signals recorded by digital recording on a magnetic tape in a first or second mode are reproduced by a signal reproducing rotary drum, in which the reproduced signals are subject to first signal processing by a playback amplifier and to second signal processing by a signal processing circuit, comprising:

a time base expanding circuit for performing time base expansion of first processed signals output from said playback amplifier when said reproducing rotary drum, including two rotary heads arranged within said drum and having a diameter of 30 mm and a tape wrap angle of 90°, is rotating at a second revolution rate, output signals from said time base expanding circuit being subjected to said second signal processing by said signal processing circuit; and signal switching means for bypassing said time base expanding circuit in said first mode upon receipt of a switching control signal that is also employed to control the rotary drum revolution rate, wherein in said first mode when said rotary drum is rotating at a first revolution rate the first processed signals output from said playback amplifier bypass said time base expanding circuit and are supplied to said signal processing circuit, and in said second mode when said rotary drum is rotating at said second revolution rate greater than said first revolution rate the first processed signals are supplied to said time base expanding circuit to be time base expanded and the time based expanded signals are then supplied to said signal processing circuit for said second signal processing;

said time base expanding circuit including a serial-to-parallel converter for receiving serial signals output from said playback amplifier and converting the serial signals to parallel digital signals, memory means for receiving and storing the parallel digital signals from said serial-to-parallel converter, and a clock generator for controlling the memory means to read in and read out the digital signals at time periods such that a ratio of a read in rate to a read out rate is greater than 1.

5. The digital signal reproducing apparatus of claim 4, further comprising a low-pass filter for low-pass filtering the signals output from the playback amplifier and providing the low-pass filtered signals to said serial-to-parallel converter.

6. The digital signal reproducing apparatus of claim 5, wherein said low-pass filter has a pass-band up to approximately 14 MHz.

7. The digital signal reproducing apparatus of claim 4, wherein said clock generator is controlled by a quartz oscillator having an oscillation frequency of substantially 28.6 MHz.

* * * * *